United States Patent [19]
Dell

[11] Patent Number: 5,881,072
[45] Date of Patent: Mar. 9, 1999

[54] METHOD OF DETECTING ERROR CORRECTION DEVICES ON PLUG-COMPATIBLE MEMORY MODULES

[75] Inventor: Timothy Jay Dell, Colchester, Vt.

[73] Assignee: International Business Machines Corporation, Armonk, N.Y.

[21] Appl. No.: 673,404

[22] Filed: Jun. 28, 1996

[51] Int. Cl.[6] ........................................... G06F 11/00
[52] U.S. Cl. ..................... 371/40.11; 371/37.2; 371/40.4; 371/49.1; 371/37.1; 395/157; 395/166; 364/518
[58] Field of Search ............................... 371/40.11, 40.4, 371/49.1, 37, 40; 395/157, 166; 364/518; 348/411

[56] References Cited

U.S. PATENT DOCUMENTS

| | | | |
|---|---|---|---|
| 4,761,783 | 8/1988 | Christensen et al. | 371/38 |
| 4,821,271 | 4/1989 | Kini et al. | 371/68 |
| 4,955,024 | 9/1990 | Pfeiffer et al. | 371/40.1 |
| 4,972,345 | 11/1990 | Munier et al. | 371/295 |
| 4,985,844 | 1/1991 | Pfeiffer et al. | 364/518 |
| 5,036,514 | 7/1991 | Downes et al. | 371/51 |
| 5,058,115 | 10/1991 | Blade et al. | 371/40.1 |
| 5,099,500 | 3/1992 | Furlong | 375/94 |
| 5,129,060 | 7/1992 | Pfeiffer et al. | 395/166 |
| 5,146,592 | 9/1992 | Pfeiffer et al. | 395/157 |
| 5,235,602 | 8/1993 | Klim | 371/49.1 |
| 5,274,646 | 12/1993 | Brey et al. | 371/40.1 |
| 5,287,364 | 2/1994 | Kimura | 371/40.4 |
| 5,379,304 | 1/1995 | Dell et al. | 371/40.1 |
| 5,450,422 | 9/1995 | Dell | 371/40.1 |
| 5,452,429 | 9/1995 | Fuoco et al. | 395/182.04 |
| 5,465,262 | 11/1995 | Dell et al. | 371/49.3 |
| 5,469,559 | 11/1995 | Parks et al. | 395/433 |
| 5,488,691 | 1/1996 | Fuoco et al. | 395/185.05 |
| 5,553,231 | 9/1996 | Papenberg et al. | 395/182.03 |

OTHER PUBLICATIONS

Pescatore, J.C. and Cooper, R.J., "Pseudo–Cache–Based Architecture", *IBM Technical Disclosure Bulletin*, vol. 34 No. 7A, Dec. 1991, pp. 481–485.

Scott, E.K. and Wong, B.B. "Synchronizing Error Reporting and Recovery", *IBM Technical Disclosure Bulletin*, vol. 29 No. 2, Jul. 1986, p. 570.

Aldereguia, A., Comer, D., and Diokno, R., "Swapping Failing Bits in 40–Pin Error Correcting SIMMS", *IBM Technical Disclosure Bulletin*, vol. 37 No. 09, Sep. 1994, pp. 595–596.

Hunter, S.W. and Stacy, J.K., "Unique Method for Reporting Errors Detected/Corrected by ECC Circuitry", *IBM Technical Disclosure Bulletin*, vol. 36 No. 09A, Sep. 1993, pp. 563–564.

*Primary Examiner*—Reba I. Elmore
*Assistant Examiner*—M. Marc
*Attorney, Agent, or Firm*—Schmeiser, Olsen & Watts; Howard J. Walter

[57] ABSTRACT

According to the preferred embodiment, a method is provided to electronically detect the presence of error correcting memory modules in a computer system in an easy and efficient manner. The method forces an error in the memory system and detects whether there is an error reporting output on the error active line. In the preferred method, the memory refresh for the memory system is turned off for a period of time sufficient to introduce errors in the memory. Then, a read is done while monitoring the error active line. If any bank of memory has an error line active go active during a read, than an error correcting memory module is installed. If not, than a standard memory module is installed.

10 Claims, 1 Drawing Sheet

METHOD OF DETECTING ERROR CORRECTION DEVICES ON PLUG-COMPATIBLE MEMORY MODULES

BACKGROUND OF THE INVENTION

1. TECHNICAL FIELD

This invention generally relates to random access memory systems, and more specifically relates to the use of error-correction code (ECC) on industry standard random access memory modules.

2. BACKGROUND ART

The integrity of computer memory systems is of vital importance in modern computer application. Unfortunately, most memory systems in personal computers, including the widely used industry standard single-inline-memory modules (SIMMs), have only had the capability of writing and checking parity. In such a system, if an odd number of bits of memory is corrupted, the bad parity condition will be flagged. While these systems can detect an odd-parity error, they cannot correct the error and generally the system will shut down when the error is detected. Thus, an error event can cause significant problems to the user, such as the loss of important data and system crashes. Additionally, these systems generally have no ability to detect double or other even number bit errors. Thus, the possibility of errors and their effects remains a serious problem. The probability of these types of errors will increase as the amount of memory in computer systems increases and the size of the software application that uses the memory increases.

Methods and apparatus for overcoming the limitations of standard SIMMs is disclosed in: U.S. Pat. No. 5,379,304, "Method and Structure for Providing Error Correction Code and Parity for Each Byte on SIMM's"; U.S. Pat. No. 5,465,262, "Method and Structure for Providing Error Correction Code and Automatic Parity Sensing"; and U.S. Pat. No. 5,450,422, "Method and Structure for Providing Error Correction Code for Each Byte of SIMM's" (each issued to Dell et al. and assigned to International Business Machines Corp.), which are incorporated herein by reference. These patents disclose a system that provides error correction on memory modules that are compatible with memory sockets used on an industry standard computer system without modification. These systems are commonly referred to as ECC on SIMMs, or EOS memory. The EOS memory modules includes application specific integrated circuits (ASICs) that facilitates error correction of memory errors in a way that is transparent to the system. Thus, the EOS memory module is a plug-compatible, fully retrofittable assembly that adds ECC function to a system that does not have native ECC support.

Because these EOS memory modules are completely compatible with industry standard SIMMs and memory systems, there has been no way to tell whether an EOS memory module or a standard SIMM is installed on the computer without physically looking. Visual identification is time-consuming and prone to errors, and an automated method for detecting whether EOS modules are installed would be preferred.

Thus, the prior art suffers from the inability to electronically detect the presence of EOS memory modules in a computer system. Therefore, what is needed is and easy and inexpensive method for determining if a computer system has EOS or standard SIMMs installed.

DISCLOSURE OF INVENTION

A method for detecting the presence of an error correcting memory module in a computer system is provided that comprises: turning off the memory refresh, allowing errors to be introduced into the memory; and reading from memory while monitoring a signal that indicates when ECC circuitry is active, if present.

In the preferred method, the memory refresh for the memory system is turned off for a period of time sufficient to introduce errors in the memory. Then, a read is done while monitoring the error active line. If any bank of memory has an error line go active during a read, than an error correcting memory module is installed. If not, than a standard memory module is installed.

It is thus an advantage of the present invention to provide an easy method for electronically determining the type of memory installed on a computer system.

The foregoing and other advantages and features of the invention will be apparent from the following more particular description of a preferred embodiment of the invention, as illustrated in the accompanying drawing.

BRIEF DESCRIPTION OF DRAWINGS

The preferred exemplary embodiment of the present invention will hereinafter be described in conjunction with the appended drawings, where like designations denote like elements.

BEST MODE FOR CARRYING OUT THE INVENTION

Figure 1:
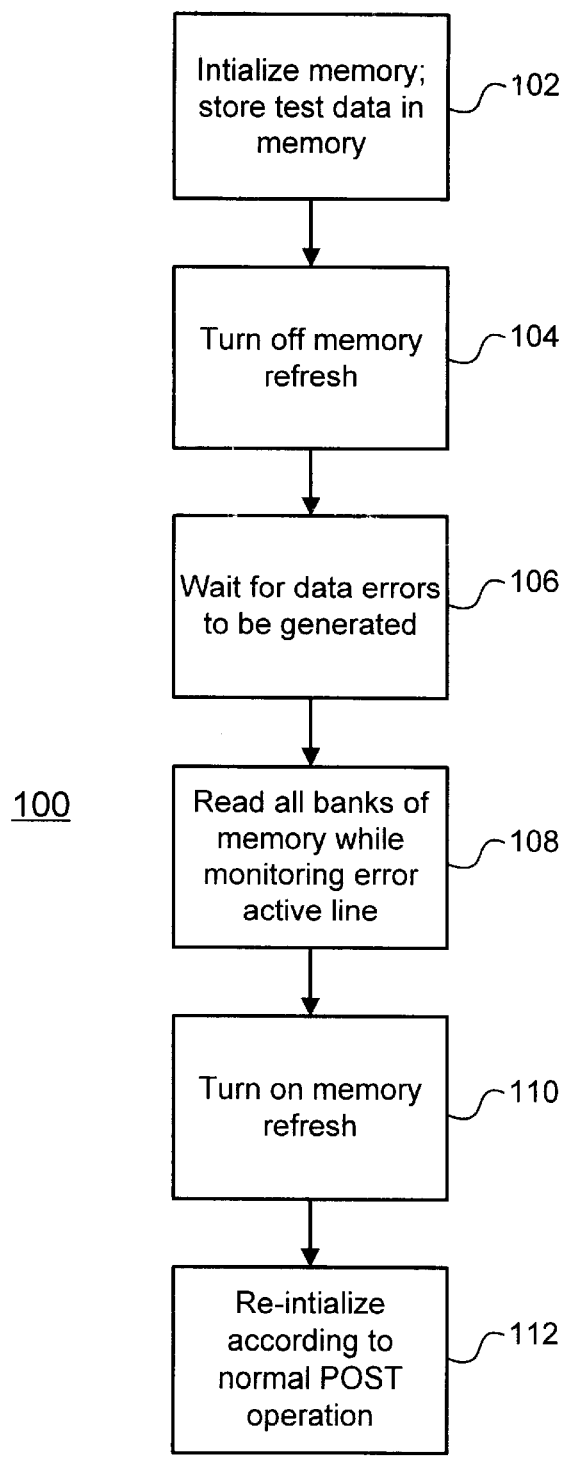
FIG. 1 is a flow-diagram illustrating an EOS detection method.

In computer systems using standard pluggable memory modules such as single-inline-memory modules (SIMMs) or dual-inline-memory modules (DIMMs), error correction code on standard memory module systems provide error correction functionality in a plug-compatible, fully retrofittable memory module assembly. These systems are generally referred to as EOS systems, for error correction code (ECC) on SIMMs. For this disclosure, the term EOS is defined to mean the use of ECC in memory modules that are compatible with standard memory modules, such as SIMMs or DIMMs.

The EOS memory modules contain application specific integrated circuits (ASIC) that provide error correction code in a way that is transparent to the system, thus providing ECC function to a computer system that does not have native ECC support. EOS memory modules are typically designed to be completely plug compatible with standard memory modules (such as SIMMs) as defined by the Joint Electronic Device Engineering Council (JEDEC). One feature of the EOS memory modules is the use of an error active line. The error active line uses a pin defined by the JEDEC standard for memory modules as a "no-connect." No-connect pins are pins that are normally not connected to anything on the memory module. EOS systems typically use a no connect pin as an error active line. When the EOS system provides memory correction, the error active line is driven low, signifying the operation. For purposes of this disclosure, an error active line is defined as any signal signifying the operation of the EOS system.

Most memory modules used in modern computer systems are dynamic random access memory (DRAM). These DRAM modules require periodic refresh or they will lose data. Most DRAMs require refresh between every 32 milliseconds and 128 milliseconds or data begins to be lost. The refresh is controlled by the memory controller and most commercially available memory controllers allow the DRAM refresh to be turned off.

The preferred embodiment method of the present invention provides a way to electronically detect the presence of EOS memory modules in an easy and efficient manner. The method forces an error in the memory system and detects whether there is an error reporting output on the error active line. In the preferred method, the memory refresh for the memory system is turned off, and after a wait, a read is done while monitoring the error active line. If any bank of memory has an error line active go active during a read, than an EOS memory module is installed. If not, than a standard SIMM is installed.

Turning now to FIG. 1, FIG. 1 is flow diagram illustrating an EOS detection method 100. The first step 102 is to initialize the memory as part of a normal power-on-self-test (POST) operation. This tests the hardware and memory and initializes the system. As part of the initialization, data is stored into memory to be used for memory tests. Typically, the data will simply consist of checker board of bits, i.e., alternating ones and zeros.

The next step 104 is to turn off the memory refresh. As stated before, most commercial memory controllers allow the memory refresh to be activated and deactivated. Also, at this step the memory systems parity checking can be turned off if it is a parity checking system. Again, most memory controllers allow the parity checking to be activated and deactivated. The parity checking is turned off to keep the parity checking memory system from shutting down the computer when parity errors are generated and detected.

The next step 106 is to wait for errors to be generated in the memory by the fading of charge from the DRAM. With the refresh off, charge will drain from the DRAM and bits of data will be lost. This introduces errors into the stored memory that can be detected and possibly repaired by the EOS memory module. With a typical DRAM that requires a 32 millisecond refresh rate, a wait of approximately 5 seconds is usually sufficient to generate sufficient errors in the stored memory. Of course, DRAMs with other refresh rates may use or require different wait times.

The next step 108 is to read from all banks of memory while monitoring the error active line. If the error active line for any address of memory goes active during the read then an EOS memory module is installed. Conversely, if the error active line stays inactive during the reads, then an industry standard SIMM is installed.

Thus, the preferred method requires a mechanism for monitoring the error active line. Because the error active line is normally a no-connect for standard SIMMs, prior art computer systems are not designed to monitor the pin. These systems would require a memory system that could monitor the error active line.

By monitoring for activity on the error active line it can be determined if there is an EOS memory module or an industry standard SIMM. Activity on the error active line signifies the EOS memory is trying to correct the errors generated in step 106, and hence the computer has EOS memory. If no activity is detected on the error line, then it is an standard SIMM. When the determination is made, the information can be passed on to the user by displaying the information on the screen.

The next step 110 is to turn the memory refresh on. Additionally, the memory parity is turned back on if it was turned off at step 104. This prepares the memory system for normal operation. The next step 112 is to re-initialize according to normal POST operation.

Thus, an easy method is provided for electronically detecting EOS memory systems on computers. This can be used to assure that memory on the computer is the type desired by the customer or user.

The method could be used for detecting other features in the memory system. With the memory refresh off, DRAM memory will begin to lose data. The amount of time in which data loss begins to occur could be used to differentiate the type of DRAM that is on the computer system, i.e., between DRAM that must be refreshed every 32 milliseconds or every 128 milliseconds. For example, if data loss occurs at 50 milliseconds of wait, then the DRAM is 32 millisecond. If instead no data loss occurs until 150 milliseconds, the DRAM is 128 millisecond.

While the invention has been particularly shown and described with reference to a preferred exemplary embodiment thereof, it will be understood by those skilled in the art that various changes in form and details may be made therein without departing from the spirit and scope of the invention. For example, the procedure is equally applicable to any type of computer systems containing DRAM.

I claim:

1. A method for determining the presence of an error correction device in a memory system, the method comprising the steps of:

a) introducing errors into said memory system; and b) monitoring said memory system for the presence of error correction.

2. The method of claim 1 wherein said memory system comprises DRAM memory and wherein said step of introducing errors into said memory system comprises turning the refresh off on the DRAM memory for a time period that assures said introduction of said errors.

3. The method of claim 1 wherein said memory system comprises DRAM memory and a refresh circuit, and wherein said step of introducing errors into said memory system comprises:

i) storing data in said DRAM;

ii) turning off said refresh circuit; and iii) waiting for errors to occur in said DRAM.

4. The method of claim 3 wherein said step of waiting for errors comprises waiting for approximately five seconds.

5. The method of claim 1 wherein said memory system comprises DRAM memory and wherein said step of monitoring said memory system for the presence of error correction comprises:

i) reading data from said DRAM memory; and ii) monitoring an active error line on said memory system.

6. A method for detecting the presence of an error correction device on a dynamic memory module for a computer system, the dynamic memory module having an error active output line, the method comprising the steps of:

a) powering up the dynamic memory module;

b) storing data on said dynamic memory module;

b) turning off refresh for the dynamic memory module; and c) reading said data from said dynamic memory module while monitoring said error active line.

7. The method of claim 6 wherein the error active output line is in a first logic state when the error correction device is active and is in a second logic state when the error correction device is inactive.

8. The method of claim 7 further comprising the step of detecting said error correction device by detecting when said error active output line is in the first logic state during said step of reading.

9. A method for distinguishing between a first memory module that includes an error correction device and a second memory module that does not include said error correction device, the method comprising the steps of:

a) providing a memory module under test;

b) initializing said memory module under test, said initialization including storing data on said memory module under test;

c) disabling refresh for said memory module under test;

d) waiting for errors to be introduced into said stored data on said memory module under test; and d) reading from said memory module under test while monitoring a signal line on said memory module under test, said signal line indicating the presence of said error correction device when said first memory module is said memory module under test.

10. The method of claim 9 further comprising the step of determining the type of memory module from the state of the error active line during said step of reading.

* * * * *